(12) United States Patent
Hsu et al.

(10) Patent No.: US 6,393,588 B1
(45) Date of Patent: May 21, 2002

(54) TESTING OF USB HUB

(75) Inventors: Liang-Hao Hsu; Chih-Cheng Shen; Chao-Ting Kao; Jia-Chung Tang, all of Hsinchu (TW)

(73) Assignee: Windbond Electronics Corp. (TW)

( * ) Notice: Subject to any disclaimer, the term of this patent is extended or adjusted under 35 U.S.C. 154(b) by 0 days.

(21) Appl. No.: 09/192,935

(22) Filed: Nov. 16, 1998

(51) Int. Cl.[7] .................................................. G06F 11/13
(52) U.S. Cl. ........................................ 714/43; 710/105
(58) Field of Search ............................. 714/43, 44, 45, 714/47, 48, 25, 26, 28, 29, 30, 31; 710/105, 103, 100, 52, 53

(56) References Cited

U.S. PATENT DOCUMENTS

| | | | | |
|---|---|---|---|---|
| 5,859,993 A | * | 1/1999 | Snyder ........................ | 395/384 |
| 5,954,827 A | * | 9/1999 | Frank et al. .................. | 714/48 |
| 5,974,486 A | * | 10/1999 | Siddappa ..................... | 710/53 |
| 5,978,947 A | * | 11/1999 | Kim et al. .................... | 714/33 |
| 5,991,897 A | * | 11/1999 | Perugini et al. .............. | 714/27 |
| 6,012,115 A | * | 1/2000 | Chambers et al. ........... | 710/105 |
| 6,148,354 A | * | 11/2000 | Ban et al. .................... | 710/102 |
| 6,175,530 B1 | * | 1/2001 | Theron et al. ............... | 365/201 |

* cited by examiner

*Primary Examiner*—Nadeem Iqbal
(74) *Attorney, Agent, or Firm*—Oppenheimer Wolff & Donnelly, LLP

(57) ABSTRACT

A test apparatus for testing function of a USB hub under the control of a USB host computer is provided. The USB host computer issues a USB command during the test. The test apparatus includes a USB bus, an emulation device, a standard bus and a micro-controller device. The USB bus is coupled to the USB hub. The emulation device emulates an USB device connected to the USB bus. The standard bus is connected to the USB host computer. The micro-controller device is connected to the standard bus and the emulation device respectively to process a USB transaction corresponding to the USB command. The invention provides a testing environment which is fully compliant to the WINDOWS 98 environment.

11 Claims, 4 Drawing Sheets

TESTING OF USB HUB

FIELD OF THE INVENTION

The present invention relates to the testing of a USB hub.

BACKGROUND OF THE INVENTION

The Universal Serial Bus (USB) is a peripheral bus specification developed by PC and telecom industry leaders. Under the specification, the USB allows the plug-and-play capability of computer peripherals outside the PC case. The capability eliminates the need to install interface card into dedicated computer slots and reconfigure the system each time a peripheral is attached or detached from a PC. The USB specification is described in detail in the Universal Serial Bus Specification, Revision 1.0 published Jul. 15, 1996.

As shown in FIG. 1, the computer system 10 connects USB devices with a USB host 12, i.e. a computer system. There are two types of USB devices: the hub 16 and the function 14. A hub 16 is device which provides additional attachment points for the Computer system. A function 14 provides capabilities to the computer system. For instance, a keyboard, a mouse, an ISDN connection, a scanner, an audio device etc. Generally, there are two ports of attachment in the USB host 12. The port 1 connects to hub 16 by the wire 18. The port 2 connects to the function 14 by the wire 13. HUB 16 connects to the functions 14 by the wires 15 respectively. Under the protocol of USB standard, the functions 14 are classified into mainly three types of device. The first one is the type of a human-interface device (HID), i.e. keyboard, mouse, or, alternately, an interrupt device. The second one is the type of a bulk device, i.e. a scanner, which places strict requirement on accuracy of each data bits transmitted. The third one is the type of an isochrome device, i.e. an audio device, which does not place strict requirement on accuracy of each data bits transmitted. The detailed definitions of these types of device may be referred to in the Specification mentioned above.

Hub 16 are therefore a key element in the plug-and-play architecture of computer system 10, and is wiring concentrator which enable the multiple attachment characteristics of USB. The upstream port of a hub 16 connects the hub 16 towards the host 12. Each of the downstream ports of a hub 16 allows connection to another hub or function 14. Hubs 16 detect the attachment and detachment of a USB device 14 at each downstream port and enable the distribution of power to these down stream USB devices 14. The wires 13, 15 and 18 all named as USB lines.

The present invention relates to the testing of a USB hub 16. With one conventional approach regarding the testing of a USB hub 16, all testing commands and return status are transmitted through the USB lines 15 and the hub 16 between the host 12 and the USB devices 14. However, since the hub 16 is a target to be tested, and as the USB command is issued to the downstream devices 14 via the USB line 15 and hub 16, the locations of errors can not be accurately determined as errors are encountered. Furthermore, some conventional testing methods are performed under the DOS environment which are substantially different from actual WINDOWS 98 environment.

SUMMARY OF INVENTION

Therefore, it is the main object of the invention to provide an apparatus which emulates a downstream USB device to a USB hub to test whether the USB hub being tested operate normally.

A test apparatus for testing function of a USB hub under the control of a USB host computer is provided. The USB host computer issues a USB command during the test. The test apparatus includes a USB bus, an emulation device, a standard bus and a micro-controller device.

The USB bus is coupled to the USB hub. The emulation device emulates an USB device connected to the USB bus.

The standard bus is connected to the USB host computer. The microcontroller device is connected to the standard bus and the emulation device respectively to process a USB transaction corresponding to the USB command.

The invention provides a testing environment which is fully compliant to the WINDOWS 98 environment.

The advantage and spirit of the invention may be understood by the following recitations together with the appended drawings.

DETAILED DESCRIPTIONS OF THE INVENTION

Figure 1:
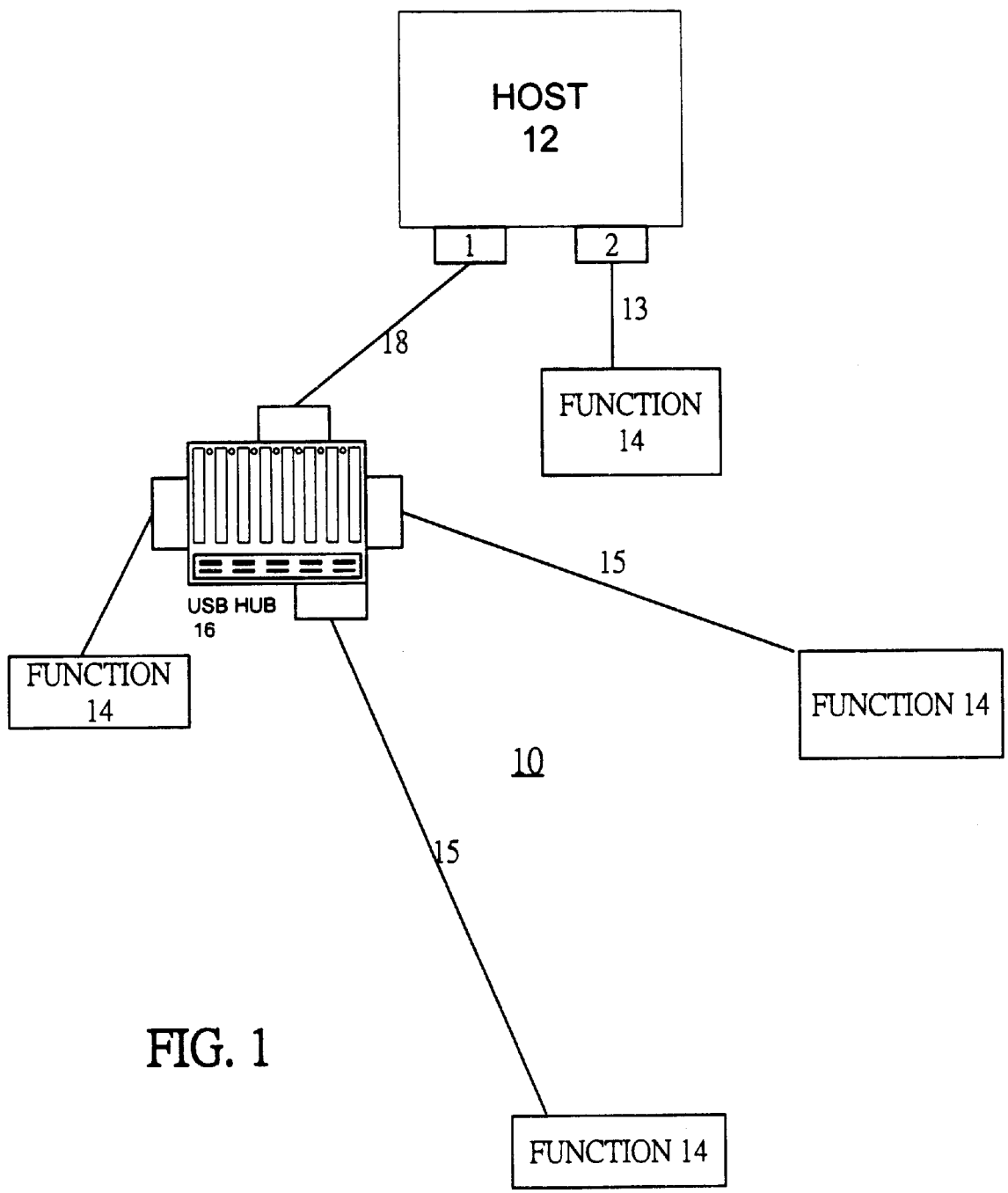
FIG. 1 shows a conventional computer system with USB functionality.
Figure 2:
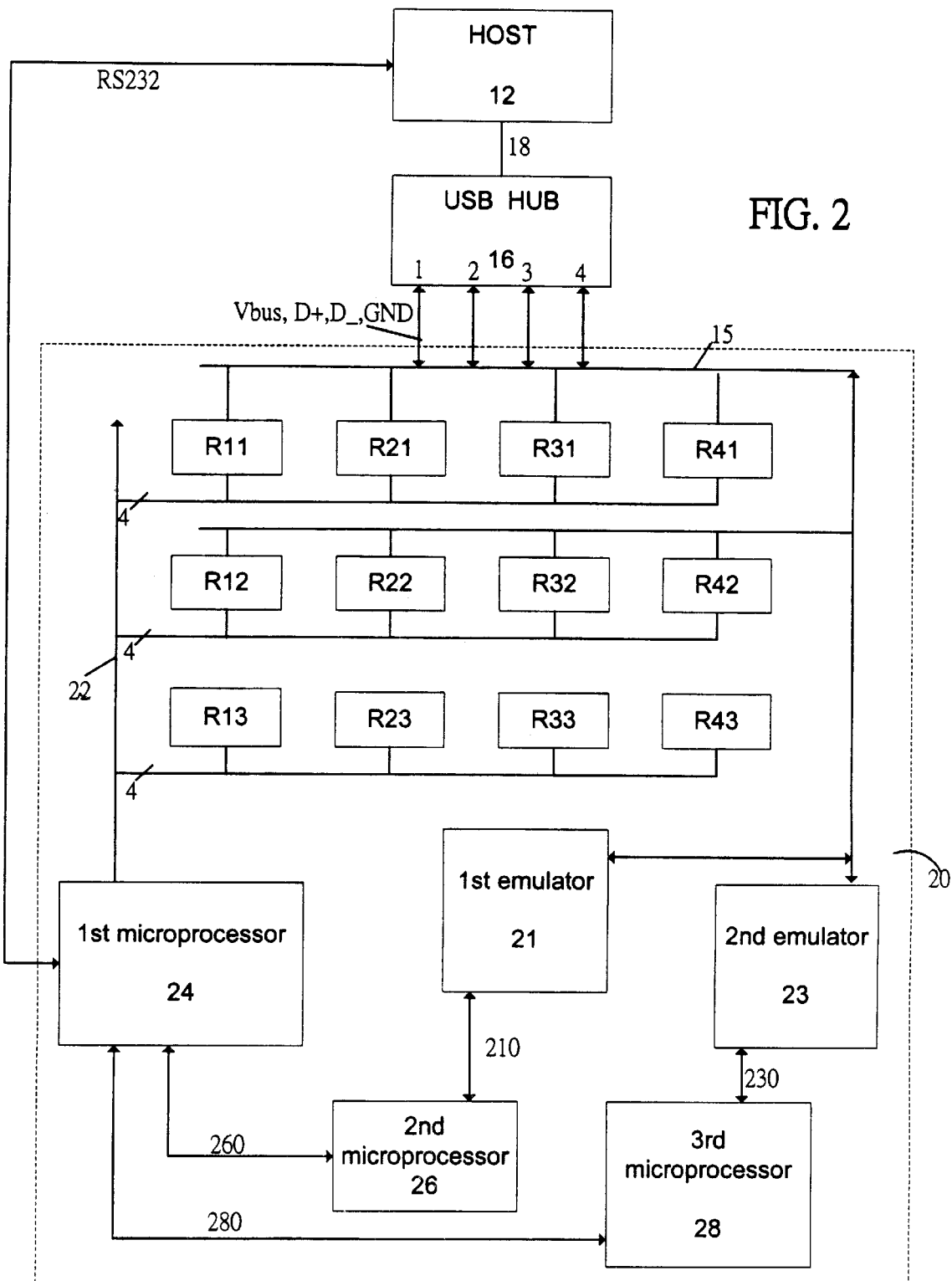
FIG. 2 shows a testing apparatus of the invention.

As depicted in FIG. 2, the testing apparatus of the invention includes an emulation apparatus 20 connected to the USB hub 16 via USB lines 15. As known, during the test, the USB hub 16 is connected to a host computer 12. Within the host computer 12, there is provided a Utility Program running. This Utility Program provides all instructions with regard to the testing procedures which are more clear hereinafter. For instance, the Utility Program may instruct the emulation apparatus 20 to simulate action of plug-in of the USB device or simulate action of plug-out of the USB device. In this context, the command which needs human-interface is named as non-USB command hereinafter. In other words, the USB lines 15 during testing are always plugged-in and do not involve the actual plug-in/plug-out. In addition to the USB lines 15, the emulation apparatus 20 is further electrically connected to the host computer 12 via one standard bus, i.e. RS-232.

The emulation apparatus 20 executes the USB command issued from the Utility Program running in host computer 12, via the USB hub 16, USB lines 15, during the test. The standard bus, i.e. RS-232, is used to transmit the non-USB commands from the Utility Program to the emulation apparatus 20 to emulate human actions, i.e. plug-in or plug-out of the USB lines 15. With this provision and, as a non-USB command, issued to the emulation apparatus 20 via the RS-232, is executed inaccurately, one may determine the USB hub 16 as the location of error. The USB commands may be transmitted to the emulation apparatus 20 via the USB lines 15 as need arises. Once a command is executed, the result of the execution, i.e. the status, may be transmitted to the Utility Program via either the USB lines 15 or the RS-232 or both. Through comparison, the Utility Program may easily decide which one of the emulation apparatus 20 and the USB hub 16 has error.

In a preferred embodiment, the emulation apparatus 20, as shown, includes a number of sets of relay devices. For instance, R11, R12 and R13 are one set of the relay device corresponding to one emulated device, i.e. USB keyboard. And the shown R21, R22 and R23 are another set of the relay device corresponding to another emulated device. The R31, R32 and R33 are another set of the relay device and R41, R42 and R43 are another set of the relay device.

Within the emulation apparatus 20, there is provided a first micro-controller 24, a second micro-controller 26, a third micro-controller 28, a first emulator 21 and a second emulator 23. In an alternate approach, one may integrate the first micro-controller 24, the second micro-controller 26 and the third micro-controller 28 into a single integrated controller. In another alternate approach, one may integrate the first emulator 21 and the second emulator 23 into a single integrated controller. As a preferred embodiment, the first micro-controller 24, the second micro-controller 26 and the third micro-controller 28 are respectively the well known 8051 compatible micro-controller.

The first micro-controller 24 connects to the control inputs of the relay devices through the control lines 22. In this depicted example, there are 12 bits on the control lines 22. Each relay device is controlled by one bit of the control lines 22. The first emulator 21 operates to emulate one type of the USB device, i.e. and HID type USB device. The interrupt type device is also called the human interface device (HID) in the arts. The HID type USB devices include the USB keyboard. The second emulator 23 operates to emulate another type of the USB device, i.e. a Bulk type or an Isochrome type USB device. The Bulk type USB devices include the USB scanner. The Isochrome type devices include the USB audio apparatus.

The ON/OFF of relay devices R11, R21, R31 and R41 are used to respectively emulate the ON/OFF of the corresponding ports connected. That is, the ON/OFF of relay devices R11, R21, R31 and R41 emulates respectively the plug-in or plug-out of the USB devices connected to one corresponding port 1, 2, 3 or 4. The statuses of the relay devices R11, R21, R31 and R41 are transmitted back the Utility Program via the USB lines 15, the USB hub 16, or, alternatively via the USB lines 15, the first emulator 21, the second micro-controller 26, the first controller 24 and the RS232, or, alternatively, via the USB lines 15, the second emulator 23, the third micro-controller 28, the first controller 24 and the RS-232. The ON/OFF of relay devices R12, R22, R32 and R42 are used to emulate the switching of high/low speed of operation of one corresponding USB device respectively. The statuses of the relay devices R12, R22, R32 and R42 are transmitted back to the Utility Program via the USB lines 15, the USB hub 16, or, alternatively, via the USB lines 15, the first emulator 21, the second micro-controller 26, the first controller 24 and the RS-232, or, alternatively, via the USB lines 15, the second emulator 23, the third micro-controller 28, the first controller 24 and the RS-232. The ON/OFF of relay devices R13, R23, R33 and R43 are used to emulate the over-current protection of one corresponding USB device respectively.

The first emulator 21 and the second emulator 23 are, for instance, respectively a flash memory device with pre-programmed firmware. The firmware within the first emulator 21 may emulate the function of an HID device. The firmware within the second emulator 23 may emulate the function of a bulk type device or an isochrome type device.

As 8051 compatible micro-controller is used as the first, the second and the third micro-controller 24, 26, 28 respectively, the well known $I^2C$ bus is used to communicate the micro-controllers as shown. The first emulator 21 communicates with the second micro-controller 26 via the lines 210. The second emulator 23 communicates with the third micro-controller 28 via the lines 230.

As the Utility Program issues a non-USB command, i.e. a plug-in action of port 1, via the RS-232, the first micro-controller 24, in response, issues a control signal to relay device R11 which corresponds to the port 1. The relay device R11 then, in response, is closed to emulate the plug-in of the port 1. The status of the relay device R11 is read either by USB hub 16 via the USB line 15 or read by the first emulator 21 via the USB line 15. Under the control of the Utility Program, the status may be returned to the Utility Program either through RS-232 or line 18. If RS-232 is specified, then the status is transmitted through the first emulator 21, line 210, the second micro-controller 26, the $I^2C$ bus 260 and the first micro-controller 24.

In parallel, the relay device corresponding to the port of a bulk-type or a isochrome-type device may be controlled in the same way. Under the control of the Utility Program, the status may be returned to the Utility Program either through RS-232 or line 18. If RS-232 is specified, then the status is transmitted through the second emulator 23, line 230, the third micro-controller 28, the $I^2C$ bus 280 and the first micro-controller 24. Through the provision of the invention, the location of the bug can be found easily during test.

Figure 3:
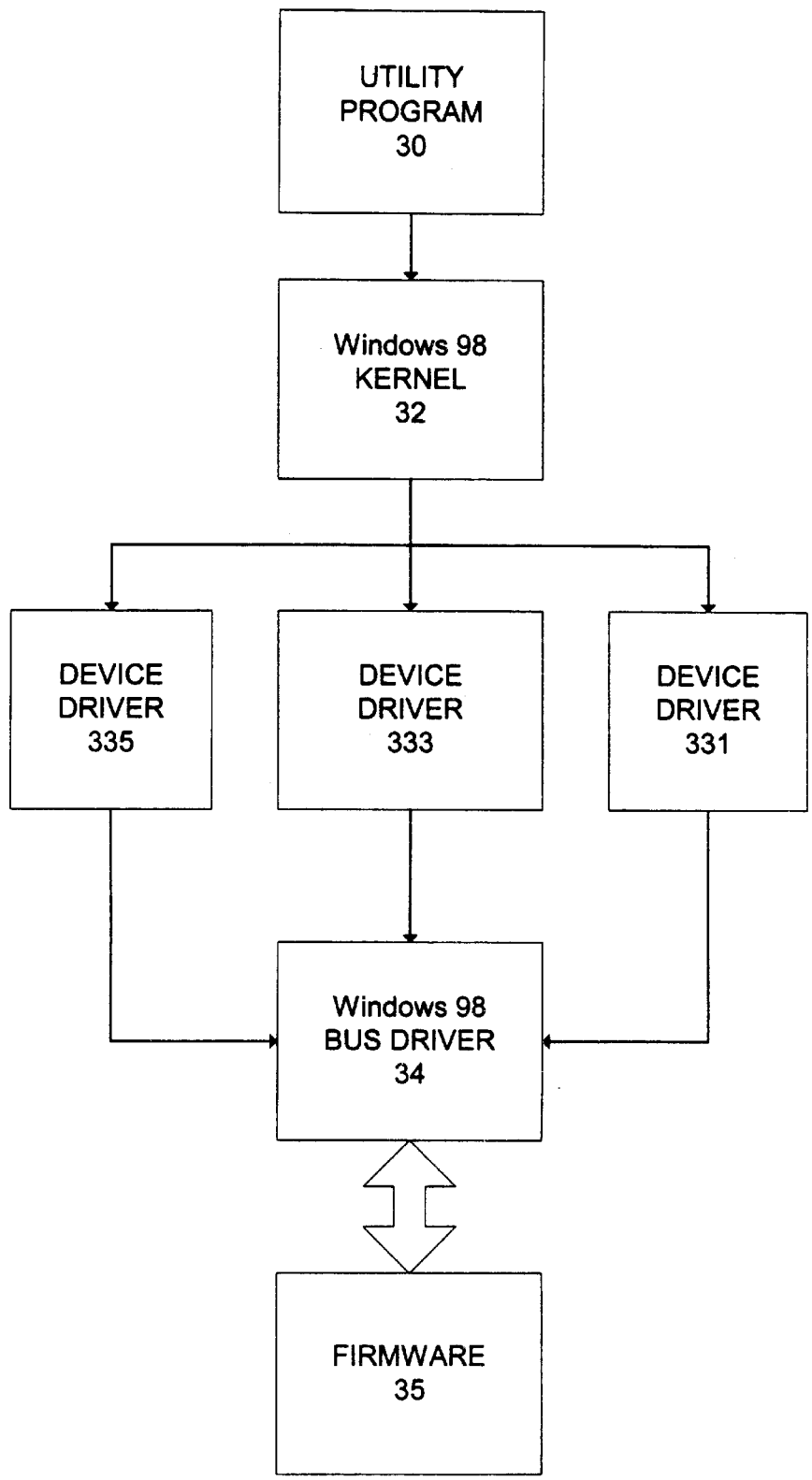
FIG. 3 shows the software architecture implementing the test method of the invention.

The software architecture of the invention is shown in FIG. 3. As a command is issued by the Utility Program 30, the WINDOWS 98 kernel 32 operates accordingly to call a corresponding down stream device driver 331, 333 or 335. Thereafter, the corresponding device driver is called to drive the WINDOWS 98 bus driver 34. In succession, the command is received by the firmware 35 either within the first emulator 21 or the second emulator 23. In response, the first or second emulator 21, 23 then instructs the corresponding first or second micro-controller 26, 28 to perform the required USB command.

Figure 4:
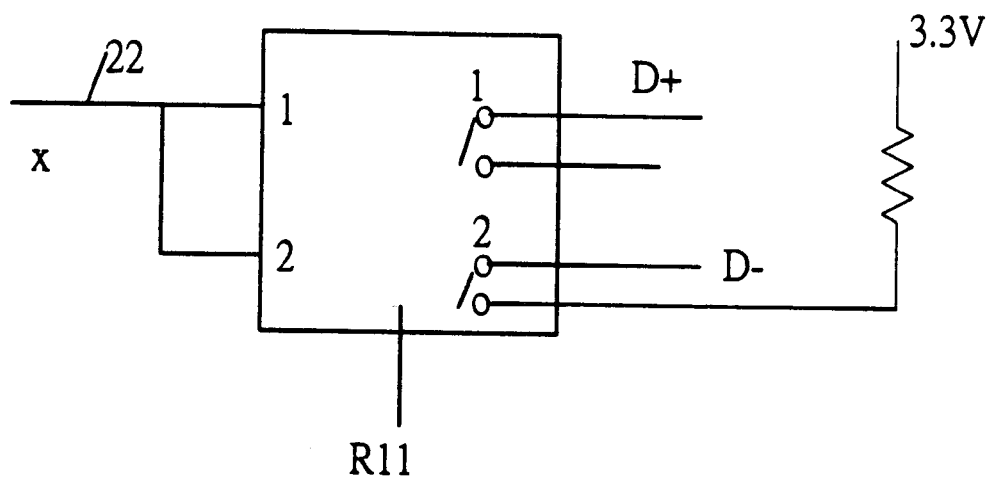
FIG. 4 shows one embodiment of the relay devices which emulate the device plug-in, plug-out, low speed device and high speed device.
Figure 4:
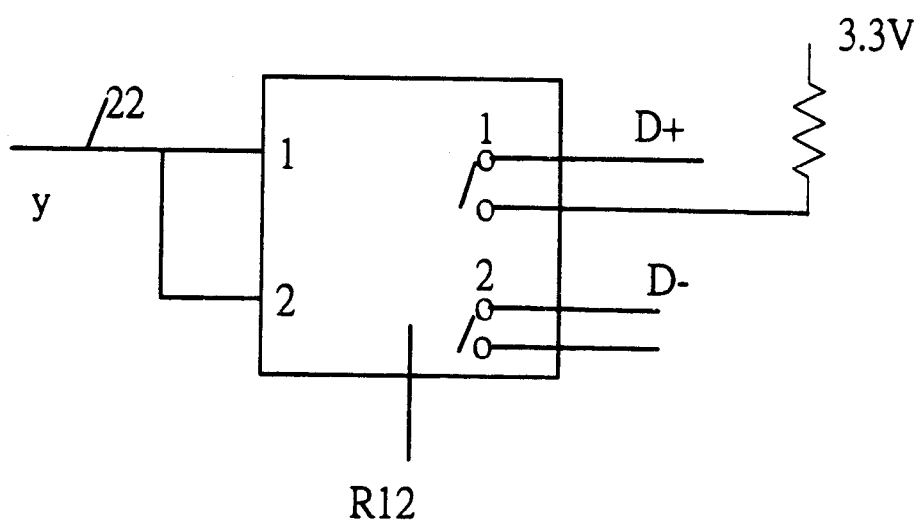

To illustrate how the statuses of the relay devices, for instance, R11 and R12 are transmitted to the USB hub 16 and how these statuses are used by the invention, the preferred embodiments for the R11 and R12 are shown in FIG. 4.

As shown in FIG. 4, the relay device R11 has two control inputs 1 and 2 respectively receiving bit x signal. The bit x signal is one signal within the control lines 22 of FIG. 2. Also, the relay device R12 has two control inputs 1 and 2 respectively receiving bit y signal. The bit y signal is one signal within the control lines 22 of FIG. 2. The relay device R11 has first and second relays corresponding to the control inputs 1 and 2 respectively. The relay device R12 has first and second relays corresponding to the control inputs 1 and 2 respectively. The first relay within the relay device R11 has a D+ signal output terminal and the second relay within the relay device R11 has a D_ signal output terminal. The first relay within the relay device R12 has a D+ signal output terminal and the second relay within the relay device R12 has a D_ signal output terminal. The D− signal output terminal of R11 is connected to the D− signal output terminal of R12 and the D− signal is one signal within the USB lines 15 of FIG. 2. The D+ signal output terminal of R11 is connected to the D+ signal output terminal of R12 and the D+ signal is one signal within the USB lines 15 of FIG. 2. When bit x=1, the first and second relays of R11 are close, the D− output terminal thereof outputs logic high signal. The D_ is a status output terminal, which is coupled to the USB bus 15, of the relay 11. When bit y=1, the first and second relays of R12 are close, the D+ output terminal thereof outputs logic high signal. The D+ is a status output terminal, which is coupled to the USB bus 15, of the relay 12. As bit x is set to be 1 and bit y is set to be 0, the D− signal within USB lines 15 is logic high. According to the specification of USB standard, this indicates a condition of low speed device being plugged in. As bit y is set to be 1 and bit x is set to be 0, the D+ signal within USB lines 15 is logic high. According to the specification of USB standard, this indicates a condition of high speed device being plugged in. As bit x is set to be 0 and bit y is set to be 0, according to the specification of USB standard, this indicates a condition of the USB device being plugged out. Therefore, the conditions of plug-in, plug-out and switching between the high and low speed operations are emulated through the relay devices R11 and R12.

It may be readily understood that operations of R21, R22 and R31, R32 and R41, R42 may be similar to that of R11, R12 recited above.

What is claimed is:

1. A test apparatus for testing function of a USB hub under the control of a USB host computer, the USB host computer issuing a USB command during the test, comprising:

a USB bus coupled to the USB hub;

means for emulating an USB device connected to the USB bus;

a standard bus connected to the USB host computer;

a micro-controller means connected to the standard bus and the emulating means respectively for processing a USB transaction corresponding to the USB command; and a relay which functions to emulate the plug-in and plug-out action of the test apparatus.

2. The test apparatus of claim 1, wherein the standard bus is a RS-232 bus.

3. The test apparatus of claim 1, the USB host computer further issuing a plug-in or plug-out command of the test apparatus, wherein the plug-in command is transmitted through the standard bus.

4. The test apparatus of claim 1, wherein the relay has a status output terminal coupled to the USB bus.

5. A method for testing function of a USB hub under the control of a USB host computer, the USB host computer issuing a plug-in or plug-out command to a test apparatus during the test, the test apparatus comprising a USB bus coupled to the USB hub, means for emulating a USB device connected to the USB bus, a standard bus connected to the USB host computer, a micro-controller means connected to the standard bus and the emulating means respectively for processing a transaction corresponding to the command, and a relay which functions to emulate the plug-in and plug-out action of the test apparatus, the method comprising the steps of:

transmitting the plug-in or plug-out command via the standard bus;

the micro-controller issuing a control signal to process the plug-in or plug-out command.

6. The method of claim 5, wherein the standard bus is a RS-232 bus.

7. The method of claim 5, wherein the relay has a status output terminal coupled to the USB bus.

8. A test apparatus for testing function of a USB hub under the control of a USB host computer, the USB host computer issuing a USB command during the test, comprising:

a USB bus coupled to the USB hub;

device for emulating an USB device connected to the USB bus;

a standard bus connected to the USB host computer;

a micro-controller device connected to the standard bus and the emulating device respectively for processing a USB transaction corresponding to the USB command; and a relay which functions to emulate the plug-in and plug-out action of the test apparatus.

9. The test apparatus of claim 8, wherein the standard bus is a RS-232 bus.

10. The test apparatus of claim 8, the USB host computer further issuing a plug-in or plug-out command of the test apparatus, wherein the plug-in command is transmitted through the standard bus.

11. The test apparatus of claim 8, wherein the relay has a status output terminal coupled to the USB bus.

* * * * *